United States Patent [19]

Wright

[11] 4,306,183

[45] Dec. 15, 1981

[54] VOLTAGE REGULATION CIRCUIT FOR A SOLAR CELL CHARGING SYSTEM

[75] Inventor: Maurice J. Wright, Solihull, England

[73] Assignee: Lucas Industries Limited, Birmingham, England

[21] Appl. No.: 128,846

[22] Filed: Mar. 10, 1980

[30] Foreign Application Priority Data

Mar. 14, 1979 [GB] United Kingdom ............... 08990/79

[51] Int. Cl.³ .......................... H02J 7/00; G05F 1/10
[52] U.S. Cl. ...................................... 320/39; 307/57; 320/61; 323/906
[58] Field of Search ..................... 320/2, 5, 53, 61, 39, 320/40, 43, 44; 323/906; 307/66, 57, 84; 322/28

[56] References Cited

U.S. PATENT DOCUMENTS

| 3,600,599 | 8/1971 | Wright et al. ................... 320/53 X |
| 3,696,286 | 10/1972 | Ule ................................ 320/40 X |
| 3,740,636 | 6/1973 | Hogrefe et al. ................. 320/44 X |
| 4,079,445 | 3/1978 | Hufnagel ....................... 323/906 X |
| 4,175,249 | 11/1979 | Gruber ......................... 323/906 X |
| 4,186,336 | 1/1980 | Weinberg et al. ............. 323/906 X |
| 4,243,928 | 1/1981 | Nazimek ...................... 323/906 X |

Primary Examiner—Robert J. Hickey
Attorney, Agent, or Firm—Holman & Stern

[57] ABSTRACT

A voltage regulation circuit includes an active integrator circuit which generates an output signal representing the time integral of the error between the voltage across a load and a reference voltage. The integrator circuit output is connected to a series of voltage comparators (each having hysteresis) each of which controls one of a series of separate switch elements each controlling a proportion of the total current flow from a source to the load.

16 Claims, 9 Drawing Figures

VOLTAGE REGULATION CIRCUIT FOR A SOLAR CELL CHARGING SYSTEM

This invention relates to a voltage regulation circuit which is primarily intended for use in a storage battery charging installation.

If has been proposed to use solar energy collectors for charging storage batteries, particularly in inaccessible locations where there is a continuous current drain from the battery and no mains electric supply is available. Naturally, the amount of charging current which can be supplied by a solar energy collector depends on the time of day and usually on the season of the year and on weather conditions and some form of voltage regulation which will vary the current provided by the solar energy collectors in accordance with the battery state of charge is therefore required.

Both conventional continuous series and continuous shunt type regulators have the disadvantage of high power dissipation and possible instability with certain regulator loads. Both conventional switching series and switching shunt type regulators have the disadvantage that the total available source current is switched by a single switch thereby causing large voltage disturbances across the load.

It has also been proposed (see for example Belgium Pat. No. 853124 published July 18, 1977) to utilize an error amplifier comparing the battery voltage with a reference and driving a plurality of comparators controlling switches each connected to shunt a proportion of the source output current. With such an arrangement, however, it is difficult to achieve very low frequency switch operation unless a capacitor of very large capacitance is connected across the source It is accordingly an object of the invention to provide a voltage regulator capable of use in an application such as that mentioned above which avoids or reduces the disadvantages mentioned.

A voltage regulation circuit in accordance with the invention comprises a battery voltage sensing means including an electronic active integrator circuit producing an output representing the time integral of difference between the voltage of a battery under charge and a reference voltage, a plurality of comparator circuits comparing the output of said integrator circuit with a plurality of different reference levels, and a plurality of switch devices controlled by respective ones of the comparator circuits whereby, in use, each of said switch devices acts selectively to permit or prevent the flow of a portion of the output current from charging current source means to the battery the switch devices being sequentially operated by the comparator circuits as the fraction of the current output capability of said source means required to maintain the battery voltage and the reference voltage varies, and the integrator circuit operating so as to control the duty ratio of at least one of the switch elements.

The voltage regulation circuit defined above may be used to control a battery charging installation in which the current source is constituted by a plurality of independent current source sections.

Where the voltage regulation circuit is used with a plurality of independent current source sections, one or more switch devices may be arranged to shunt each current source section.

Alternatively, where the voltage regulation circuit is used with a plurality of independent current source sections, each current source section may have an associated switch device connected in series therewith.

The voltage regulation circuit defined above may also be used in conjunction with a single current source, the switch device, which is first to permit its associated current portion to charge the battery as the fraction of the available current required to attain the reference voltage increases, being connected directly across the current source, and each of the remaining switch devices being connected in series with an associated resistor, the switch element and resistor being connected across the current source.

The comparator circuits are preferably connected to operate with hysteresis to provide said duty ratio control.

Figure 1:
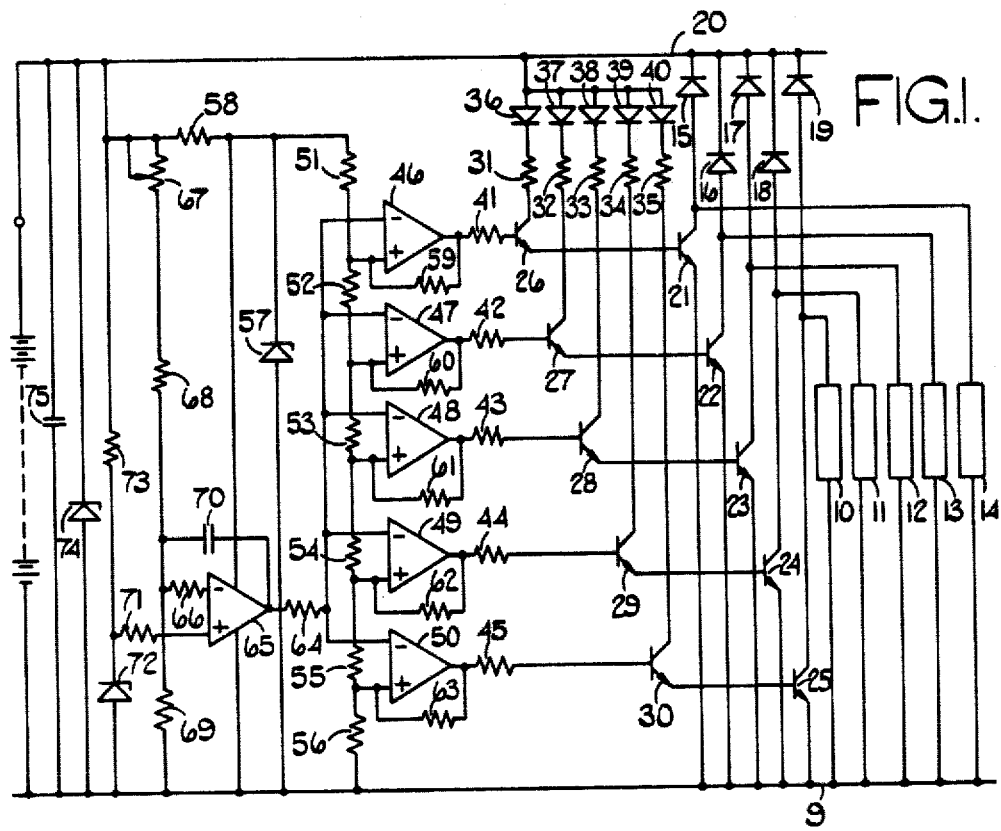
FIG. 1 is a circuit diagram of one example of the invention.

Referring firstly to FIG. 1 there is shown therein a battery charging installation including a plurality of independent solar energy conversation units 10, 11, 12, 13 and 14. These each have one output terminal connected to a negative bus 9 and the other output terminal connected by an associated one of a plurality of diodes 15, 16, 17, 18 and 19 to a positive bus 20. Associated with each unit 10 to 14 is an associated one of a plurality of switching elements in the form of npn power transistors 21, 22, 23, 24 and 25. Each such transistor has its emitter connected to the negative bus 9 and its collector connected to the said other output terminal of the associated unit 10 to 14. Thus when each transistor 21 to 25 is on it shunts the current produced by the associated unit 10 to 14.

The transistor 21 to 25 are controlled by a voltage sensing means as will now be described.

The transistors 21 to 25 have their respective bases connected to the emitters of five npn drive transistors 26 to 30. Each transistor 26 to 30 has its collector connected to the positive bus 20 by an associated one of a plurality of resistors 31 to 35 and an associated one of a plurality of light emitting diodes 36 to 40 respectively. The base of each transistor 26 to 30 is connected by a respective resistor 41 to 45 to the output of an associated one of a plurality of voltage comparators 46 to 50. The non-inverting inputs of the comparators 46 to 50 are connected to points on a resistor chain 51 to 56 connected between the cathode of a zener diode 57 and the negative bus 9. The anode of the zener diode 57 is connected to the negative bus 9 and its cathode is connected by a resistor 58 to the positive bus 20.

To provide each comparator with hysteresis an associated one of a plurality of positive feedback resistors 59 to 63 connects its output to its non-inverting input.

The inverting inputs of all the comparators 46 to 50 are connected together and are connected by a resistor 64 to the output of an operational amplifier 65 connected as an integrator. The inverting input of the amplifier 65 is connected by a resistor 66 to a point on a resistor chain consisting of a variable resistor 67 and two resistors 68, 69 connected in series between the positive and negative buses 20 and 9. A capacitor 70 is connected between the output of the operational amplifier 65 and the above-mentioned point to provide the required integrating action. The non-inverting input of the amplifier 65 is connected by a resistor 71 to the cathode of a voltage reference device 72 having its anode connected to the bus 9 and its cathode connected via a resistor 73 to the bus 20.

A protective zener diode 74 having a break down voltage less than the voltage which can cause damage to the transistors 21 to 30 is connected between the buses 9 and 20.

A capacitor 75 ensures normal operation in the event of battery disconnection during commissioning or testing.

The output voltage of the amplifier 65 is proportional to the integral of the error between the battery voltage and a reference voltage set by the reference device 72. Thus when the battery voltage is less than the reference voltage the integrator output increases at a rate proportional to the magnitude of the error. Similarly when the battery voltage is higher than the reference voltage the output of the integrator dereceases at a rate proportional to the magnitude of the error. When the output of operational amplifier is very high (indicating that the battery has been low for some time for example overnight), the outputs of all the comparators 46 to 50 will be low so that all the transistors 21 to 25 are off and any current generated by all the units 10 to 14 can flow to the battery. As battery charging proceeds in the morning its voltage rises so that eventually it rises above the reference level. The output of integrator amplifier 65 then starts to fall until the output of comparator 46 goes high. The current being produced by unit 14 is now shunted and this will cause the battery voltage to fall below the reference level so that the integrator output rises again and switches off transistor 21 thereby restoring full current to the battery. This switching on and off continues with the duty ratio of current into the battery gradually decreasing (as a result of increasing sunlight falling on the units 10 to 14) to maintain the average value of the battery voltage constant Eventually the point will be reached where switching on transistor 21 does not cause the battery voltage to fall below the reference level. The output of the amplifier 65 then continues to fall until the output of comparator 47 goes high and transistor 22 switches on so that the units 14 and 13 are both shunted. Transistor 21 now stays on continuously (assuming steadily increasing sunlight) and the duty ratio of transistor 22 is controlled to maintain the average battery voltage at the reference level.

It will be appreciated that as the sunlight intensity increases the transistors 21 to 25 are turned on successively, the last of the transistors turned on having its duty ratio controlled automatically.

The reverse sequence of events occurs when the sunlight intensity decreases, or when the current required to maintain the battery voltage increases (e.g. when a load is connected across the battery).

Thus as the fraction of the total current available from the units 10 to 14 required to maintain the battery voltage reference level decreases each of the transistors 21 to 24 is switched on in turn and as the fraction increases each of the transistors 21 to 24 is switched off in turn.

The use of an active integrator circuit in the circuit of FIG. 1 confers many benefits. Firstly, by choosing suitably large values for the resistors 66, 67, 68 and 69 and the capacitor 70, the switching frequency of the circuit can be kept low i.e. in the region of 0.1 to 1 Hz. To obtain a similar switching frequency utilizing merely the capacitor 75 for smoothing of the voltage would require capacitor 75 to have an excessively large value, so that it would need to be a bulky and expensive electrolytic device with all the known drawbacks of such devices. Furthermore, the use of a linear amplifier instead of an active integrator would give rise to problems of ensuring that the d.c. gain of the amplifier could be accurately predetermined. With an integrator d.c. gain is relatively unimportant because the error is cancelled out completely when an equilibrium condition exists. The compromise between sensitivity and stability, which arises when a linear amplifier is used, does not arise when an integrator is employed, and accurate voltage regulation is obtained.

Figure 2:
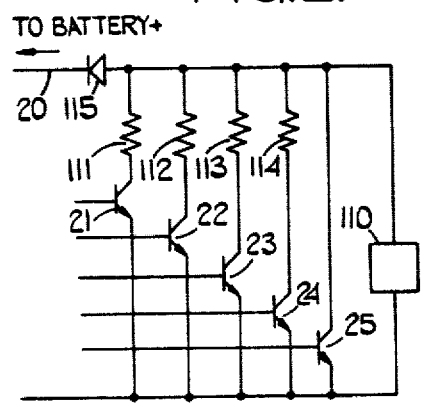
FIG. 2 is a partial circuit diagram of a second example of the invention.

In the arrangement shown in FIG. 2 the voltage sensing means itself is identical to that shown in FIG. 1, but only one high power source 110 is used. To obtain switched stepwise current control, the transistors 21 to 24 have their collectors connected by respective resistors 111 to 114 to the output terminal of the source 110 and the collector of transistor 25 is connected directly to this output terminal. A single diode 115 connects the output terminal to the positive bus 20. The values of resistors 111 to 114 are chosen so that when any transistor 21 to 24 is on its shunts one fifth of the maximum output current of the source 110. If with transistors 21 to 24 conducting too much current still reaches the battery, then transistor 25 turns on intermittently. However, transistor 25 shunts all the output current of source 110 as it is connected in parallel with resistors 111 to 114.

Figure 3:
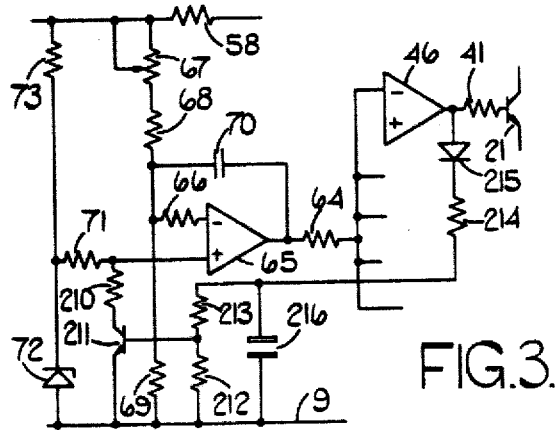
FIG. 3 is a partial circuit diagram showing a modification applicable to the first or second example of the invention.

Turning now to the modification shown in FIG. 3 a resistor 210 connects the non-inverting input of the amplifier 65 to the collector of an npn transistor 211, the base of which is connected by a resistor 212 to the negative bus 9. The base of transistor 211 is also connected by two resistors 213, 214 in series to the cathode of a diode 215 the anode of which is connected to the output of comparator 46. A capacitor 216 connects the junction of resistors 213, 214 to the bus 9. The emitter of transistor 211 is connected to bus 9.

With this modification at the start of a days charging all the comparators 46 to 50 have their outputs low so that capacitor 216 is in a discharged state. Thus, initially, the reference voltage has a value $U_1$. When the battery voltage rises above $U_1$, and eventually comparator 46 output goes high, the capacitor 216 charges up and switches on the transistor 211. This causes the reference voltage to be reduced slightly to a lower value $U_2$ which serves as the reference voltage for the remainder of the day light hours. Whilst the comparator 46 is switching on and off the capacitor 216 keeps transistor 211 on continuously.

Figure 4:
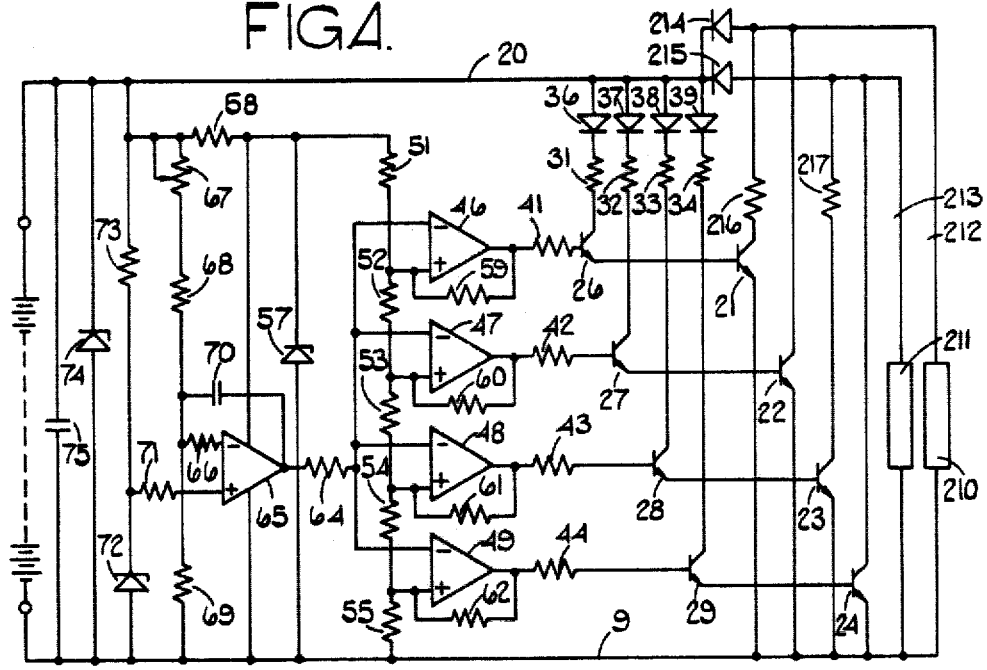
FIG. 4 is a circuit diagram of a third example of the invention.

Turning now to FIG. 4, in this example the arrangement of the voltage sensing means and power transistors is generally similar to that shown in FIG. 1 except that the comparator 50, resistor 56, transistor 30 and power transistor 25 and the elements associated therewith have been emitted. In this example there are two solar energy conversion units 210, 211, and these have their one output terminal connected to the negative bus 9 and their other output terminals connected respectively through lines 212, 213 and diodes 214, 215 to the positive bus 20. Also, the collector of the power transistor 21 is connected through a resistor 216 to line 212, the collector of power transistor 22 is connected directly to line 212, the collector of transistor 23 is connected through a resistor 217 to line 213, and the collector of transistor 24 is connected directly to line 213.

The values of resistor 216 and 217 are chosen so that when transistor 21 is conductive one quarter of the total available current is shunted, when transistors 21 and 22 are conductive one half of the available current is shunted, when transistors 21, 22 and 23 are conductive three quarters of the available current is shunted, and when all transistors are conductive the entire current is shunted.

The examples shown in FIGS. 1 to 4 are suitable for use with low voltage installations e.g. 6, 12 or 24 volts. In these examples, as the power transistors shunt the solar energy conversion units, there is no voltage drop across the switching elements during charging.

However, the general arrangement of the voltage sensing means shown in these examples is also suitable for use with switching elements connected in series with solar energy conversion units where the installation voltage is higher, for example 60 volts, and consequently the voltage drop across the switching elements is acceptable. Such an arrangement is shown in the example of FIG. 5 which will now be described.

Figure 5:
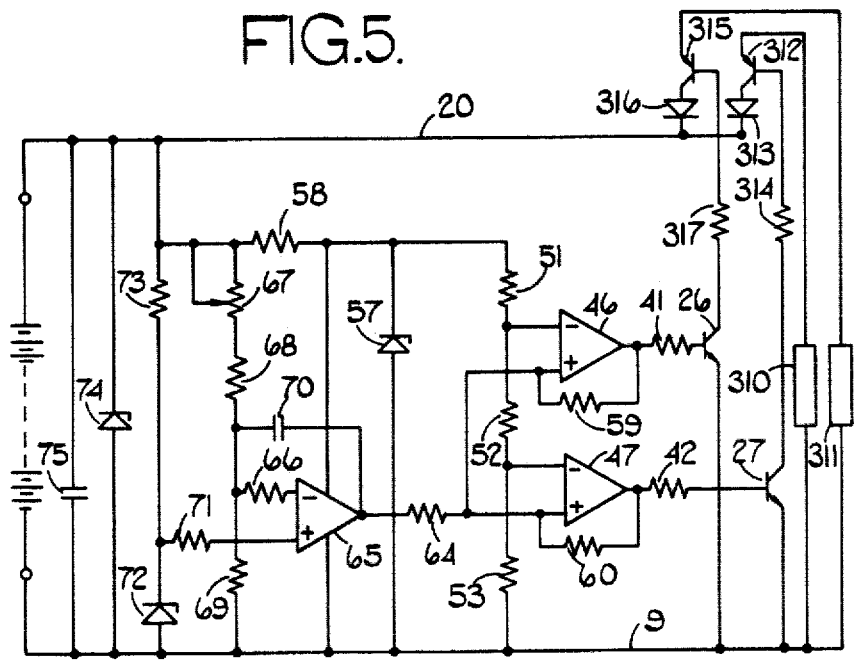
FIG. 5 is a circuit diagram of a fourth example of the invention.

In FIG. 5, the voltage sensing means is generally similar to that shown in FIG. 1 except there are only two comparators 46 and 47 and two drive transistors 26 and 27, the comparators 48, 49 and 50, and the drive transistors 28, 29 and 30 being omitted together with associated elements. Also, in the voltage sensing means of this example the polarity of the inputs of the comparators 46, 47 is reversed, and the emitters of transistors 26 and 27 are connected directly to the negative bus 9.

In this example, there are two solar energy conversion units 310, 311, the one output terminal of which are connected to the negative bus 9. The other output terminal of unit 310 is connected to the emitter of a pnp Darlington transistor 312, the collector of which is connected through a diode 313 to the positive bus 20, and the base of which is connected through a resistor 314 to the collector of drive transistor 27. The other output terminal of unit 311 is connected to the emitter of a pnp Darlington transistor 315, the collector of which is connected through a diode 316 to the positive bus 20, and the base of which is connected through a resistor 317 to the collector of drive transistor 26.

In this example, when the current available from units 310, 311 is not sufficient for the battery to maintain its reference level, both transistors 312 and 315 will be conductive. Then, as the available current increases, and the battery voltage rises above the reference level, the output of amplifier 65 will decrease thereby causing the output of comparator 46 to go low, and transistors 26 and 315 to switch off, and thereby blocking current from unit 311 from charging the battery. As the available current increases further, the transistor 315 will switch on and off with a decreasing duty ratio until eventually the transistor 315 is switched permanently off and then transistor 312 will switch on and off.

As may be appreciated, the circuit of FIGS. 4 and 5 may be modified in a manner similar to the modification shown in FIG. 3 with reference to FIGS. 1 and 2.

It will be appreciated that in all the examples described above each of the power transistors is only controlling a fraction of the current output of the current source and only one is being switched at any given instant. Consequently, the voltage disturbance problems which can arise in conventional switching series and switching shunt type regulators are less likely to arise. The change in battery voltage caused by one of the power transistors being switched on or off is relatively small so that switching can be effected at a relatively low frequency, no passive smoothing components being needed, to reduce ripple.

Also, in all these examples, as no continuous power elements are involved, there are no stability or power dissipation problems.

Further, there is no necessity for the circuit of any of these examples to be factory matched with the solar energy conversion units they are intended to control. Even if different units produce different amounts of current at the same intensity of illumination, the integrator/multicomparator voltage sensing means arrangement described above will cope adequately (provided the maximum current rating of an individual power transistor is not exceeded).

Figure 6:
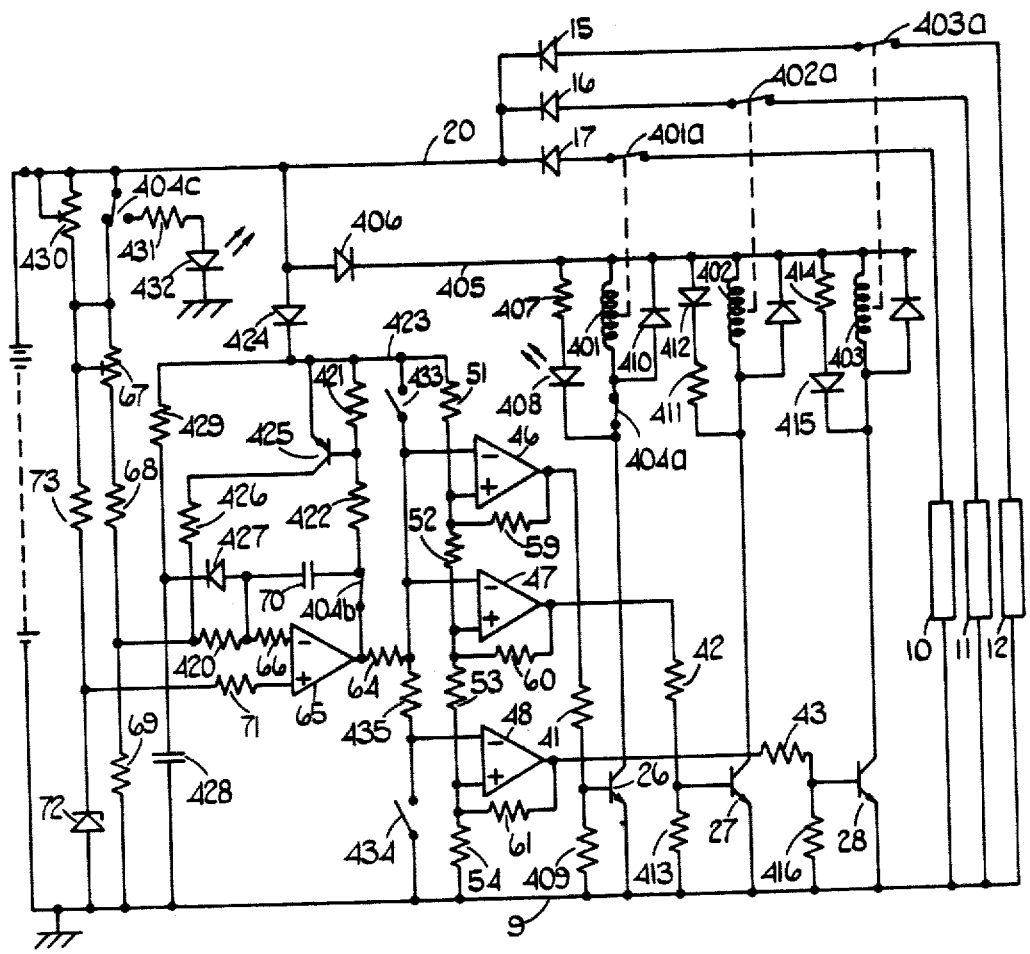
FIG. 6 is a circuit diagram of a fifth example of the invention.

Turning now to FIG. 6, elements which are common to the example shown in FIG. 1 have the same reference numerals and will not be redescribed.

Each of the transistors 26, 27, 28 now drives a relay coil instead of an output transistor, there being three such coils 401, 402 and 403. The transistor 26 has its emitter connected to rail 9 and its collector connected via a switch contact 404a to one end of the relay winding 401 the othe end of which is connected to a rail 405 which is connected by a diode 406 to the rail 20. A resistor 407 and a diode 408 (in this case a light-emitting diode) are connected in series between the rail 405 and the collector of the transistor 26. A resistor 409 connects the base of the transistor 26 to the rail 9. Similarly transistor 27 is associated with the relay winding 402, a resistor 411 and diode 412, and a resistor 413 and transistor 28 is associated with the relay winding 403, a resistor 414 and diode 415 and a resistor 416, but no switch corresponding to switch 404a is associated with transistors 27 and 28. The relays 401, 402 and 403 have normally closed contacts 401a, 402a, 403a connecting the three sources 10, 11, 12 via the diodes 15, 16, 17 to the rail 20.

To prolong the life of the relay contacts the switching rate is reduced by connecting a further resistor 420 in series with the inverting input to the operational amplifier 65. In addition a switch contact 404b ganged with the switch contact 404a is connected between the output terminal of the amplifier 65 and the capacitor 70 and two resistors 421, 422 are connected in series between the junction of this contact 404b with capacitor 70 and a rail 423 connected by a diode 424 to the rail 20. A pnp transistor 425 has its emitter connected to the rail 423 and its base connected to the junction of resistors 421 and 422. The collector of the transistor 425 is connected by a resistor 426 to the junction of the resistors 68 and 69. A diode 427 has its anode connected to the junction of resistors 66 and 420 and its cathode connected by a capacitor 428 to the rail 9 and by a resistor 429 to the rail 423.

A third ganged contact 404c of the switch 404a, 404b has its common pole connected to rail 20. One pole of contact 404c is connected to the end of resistor 67, an additional variable resistor 430 also being connected between rail 20 and the resistor 67 and being shorted out by contact 404c in one position of the latter. The other pole of contact 404c is connected by a resistor 431 and a light-emitting diode 432 to the earth rail 9.

Two further switches 433 and 434 are incorporated of which the first 433, when closed connects the inverting inputs of comparators 46 and 47 to the rail 423 and the other of which 434, connects the inverting input of comparator 48 to the rail 9, an additional resistor 435 being connected between the resistor 64, are the inverting input of comparator 48.

The resistor 429, capacitor 428 and diode 427 act to ensure correct operation when the circuit is first switched on or connected to the battery and current sources. Thus, initially, whilst the voltage on capacitor 428 is low, the output of the amplifier 65 will slew positively at a rapid rate (as compared with the very slow rate of slew which can be caused by resistor 66 and capacitor 70). Once capacitor 428 is charged to a voltage greater than that of zener diode 72, it ceases to have any effect on the operation of the circuit.

The transistor 425 with the associated resistors 421, 422 and 426 provides the same function as the added components in FIG. 3, i.e. it ensures that at day break the output of amplifier 65 is fully positive and holds transistor 425 non-conducting. As before an initial period of charging at a higher voltage is provided before the integrator output goes low enough to switch on transistor 425.

The switches 404, 433 and 434 and the associated resistors 430, 435 and 431 and diode 432 are included for use during calibration and fault finding routines and normally occupy the positions shown.

With the arrangement shown in FIG. 6 the resistor 66 and capacitor 70 are chosen to provide a switching frequency of about 0.001 to 0.01 Hz.

Figure 7:
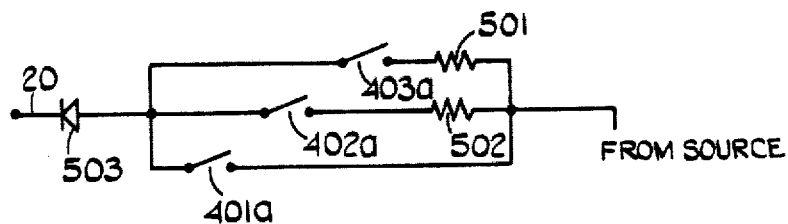
FIG. 7 is a circuit diagram showing a modification to FIG. 6.

Turning now to FIG. 7 this shows how the circuit of FIG. 6 can be modified to control a single source as in FIG. 2. The contacts 401a, 402a and 403a are used to switch resistors 501 and 502 into and out of the charge current circuit. With the three relays all de-energised, all the contacts 401a, 402a and 403a are closed so that there is a direct connection from the source via the single diode 503 to the battery. When relay 401 is energised reduced charging current flows through resistors 501 and 502 in parallel. When relays 401 and 402 are both energised, the resistor 501 alone is left in the charge current path and this path is interrupted when relay 403 is energised.

Figure 8:
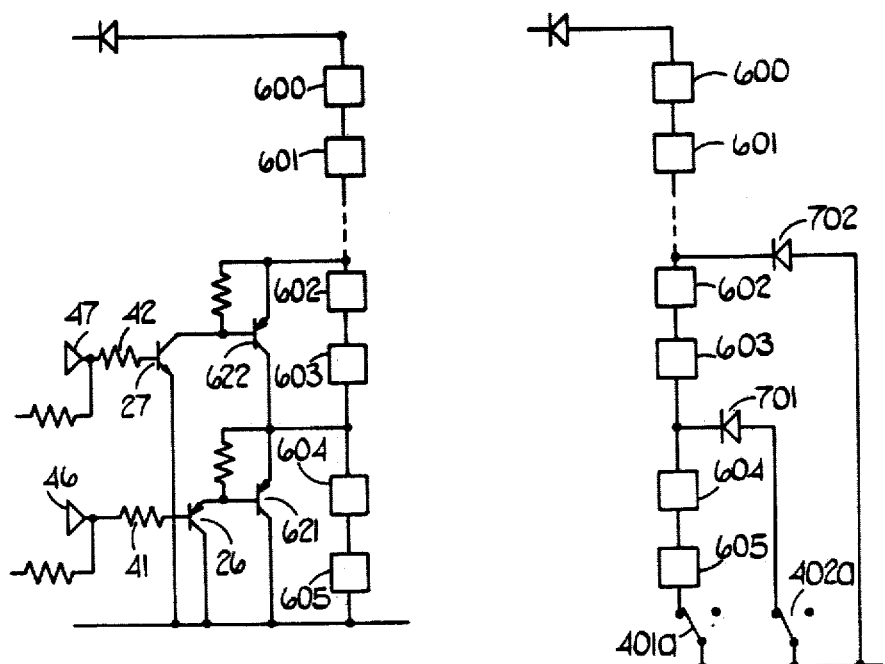
FIG. 8 is a circuit diagram showing a modification to FIG. 1.

The arrangement shown in FIG. 8 is used when it is required to charge a high voltage battery from a plurality of sources 600, 601 . . . 605 in series. With such an arrangement it is found possible to obtain the desired level of charging control by shorting out selected ones of the current sources. As shown a pnp output transistor 621 (corresponding to transistor 21 of FIG. 1) has its emitter-collector connected across two of the sources (604, 605) and another output transistor 622 has its emitter-collector connected across another two of the sources (602, 603). Each transistor 621, 622 has its base connected to the collector of a respective one of the transistors 26, 27 each of the latter having its emitter grounded and its base connected by a respective resistor 41, 42 to the output of an associated one of the comparators 46, 47 of which only two are necessary. When the output of the integrating amplifier 65 is high both transistors 621 and 622 are off so that the whole series array of sources is connected across the battery. As the output of the integrator falls during charging, the comparator 46 output goes high first, turning on transistor 26 and hence transistor 621 and thereby shorting out the two sources 604 and 605. If the integrator output falls still lower sources 602 and 603 and shorted out.

Figure 9:
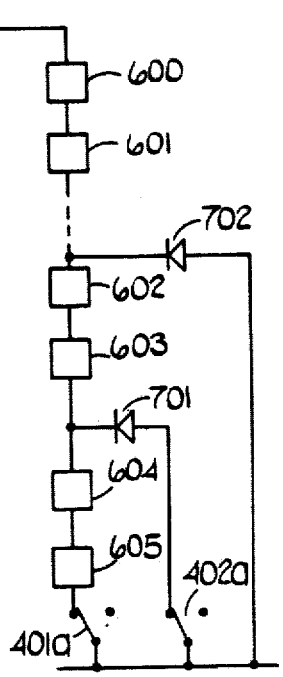
FIG. 9 is a circuit diagram showing another modification to FIG. 6.

FIG. 9 shows how the relay arrangement of FIG. 6 can be applied to a series array of sources 601 . . . 605. In this case the negative end of source 605 is connected by the normally closed relay contact 401a to ground and the junction of sources 603 and 604 is connected by a diode 701 and the normally closed contact 402a to ground. A further diode 702 connects the positive end of source 602 to earth. At high demand both contacts 401a and 402a are closed and the diodes 701 and 702 are both reversed biased so that the whole current source array is connected across the battery. When relay 401 is energised contact 401a opens and the "return" path for charging current is then through the contact 402a and diode 701. When relay 402 is energised the return path is through diode 702.

In both of FIGS. 8 and 9 removing four of the series sources from the array will result in the total source voltage being less than the battery voltage.

I claim:
1. A voltage regulation circuit comprising a battery voltage sensing means including an electronic active integrator circuit producing an output representing the time integral of difference between the voltage of a battery under charge and a reference voltage, a plurality of comparator circuits comparing the output of said integrator circuit with a plurality of different reference levels, and a plurality of switch devices controlled by respective ones of the comparator circuits whereby, in use, each of said switch devices acts selectively to permit or prevent the flow of a portion of the output current from charging current source means to the battery the switch devices being sequentially operated by the comparator circuits as the fraction of the current output capability of said source means required to maintain the battery voltage and the reference voltage varies, and the integrator circuit operating so as to control the duty ratio of at least one of the switch elements.

2. A circuit as claimed in claim 1 in which the current source means comprises a plurality of independent current source sections, each switch device controls one of said sections.

3. A circuit as claimed in claim 2 in which each switch device is connected across said current source section so as when energised to shunt said section.

4. A circuit as claimed in claim 2 in which switch devices are connected in series with the current source sections so as when non-conductive to block current flowing from that section to the battery.

5. A circuit as claimed in claim 3 in which said current source sections are connected in parallel circuits, each circuit including a diode whereby current is prevented from flowing into a shunted current source section from the battery.

6. A circuit as claimed in claim 3 in which the current source sections are in series.

7. A circuit as claimed in claim 4 in which the current source sections are connected in parallel by means of said switch devices.

8. A circuit as claimed in claim 1 in which said current source means comprises a single current source, one of said switch devices being connected directly across the current source and the remainder being connected in parallel with said one switch device and in series with an associated resistor.

9. A circuit as claimed in claim 1 in which said current source means comprises a single current source, one of said switch devices connecting said source directly to the battery and the remainder being connected in series with an associated resistor and in parallel with said one switch device.

10. A circuit as claimed in claim 1 including means for varying said reference voltage.

11. A circuit as claimed in claim 10 in which said reference voltage varying means comprises a circuit acting to effectively increase the reference voltage when the integrator output is continuously at a level indicating a low battery voltage.

12. A circuit as claimed in claim 11 in which the active integrator circuit comprises an operational amplifier, a resistive voltage sensing network, means connecting a point on said voltage sensing network to the inverting input of the operational amplifier; a feedback capacitor connected between the output and inverting input of said amplifier; a reference voltage network, a resistor connecting a point on the reference voltage network to the non-inverting input of the operational amplifier, said reference voltage varying means comprising a transistor having its collector-emitter connecting the non-inverting input of the operational amplifier to a low voltage point, the base of the transistor being connected to the output of the one of the comparators which operates the associated one of the switch devices when the integrator output voltage is at its highest level.

13. A circuit as claimed in claim 11 in which the active integrator circuit comprises an operational amplifier, a resistive voltage sensing network, means connecting a point on the voltage sensing network to the inverting input of the operational amplifier, a capacitor connected between the output of the operational amplifier and its inverting input, and a voltage reference network connected to the non-inverting input of the operational amplifier, said reference voltage varying means comprising a transistor having its collector emitter connected between said point on the voltage sensing network and a higher voltage point and its base connected to the output of the operational amplifier so that the transistor is turned off only when the operational amplifier output voltage is above a predetermined level.

14. A circuit as claimed in claim 1 in which said switch devices are transistors controlled by the comparators.

15. A circuit as claimed in claim 1 in which the switch devices are relays controlled by the comparators.

16. A solar panel storage battery charging system comprising a storage battery, a plurality of solar panels for supplying charging current to the battery, a plurality of relays, each having a contact in series with a respective one of the solar panels, diode means connecting the series circuits constituted by the solar panels and associated relay contacts in a parallel array across the battery, a plurality of comparator means connected to energise the respective relays, each comparator means receiving a common charge current demand signal and a respective one of a plurality of predetermined reference level signals, whereby the comparator means are actuated successively to operate respective relays and connect the solar panels in circuit with the battery as said charging current demand signal rises, a battery voltage sensing circuit connected across the battery, a reference voltage circuit connected across the battery and an electronic active integrator circuit connected to said voltage sensing circuit and said voltage reference circuit and producing as its output and current demand signal which represents the time integral of the error between the signals received by the integrator circuit from the voltage sensing circuit and the voltage reference circuit, the output of the integrator circuit being connected to one input of each comparator circuit.

* * * * *